A. J. HALL.
SYSTEM OF CONTROL.
APPLICATION FILED JULY 5, 1917.
1,349,375.
Patented Aug. 10, 1920.
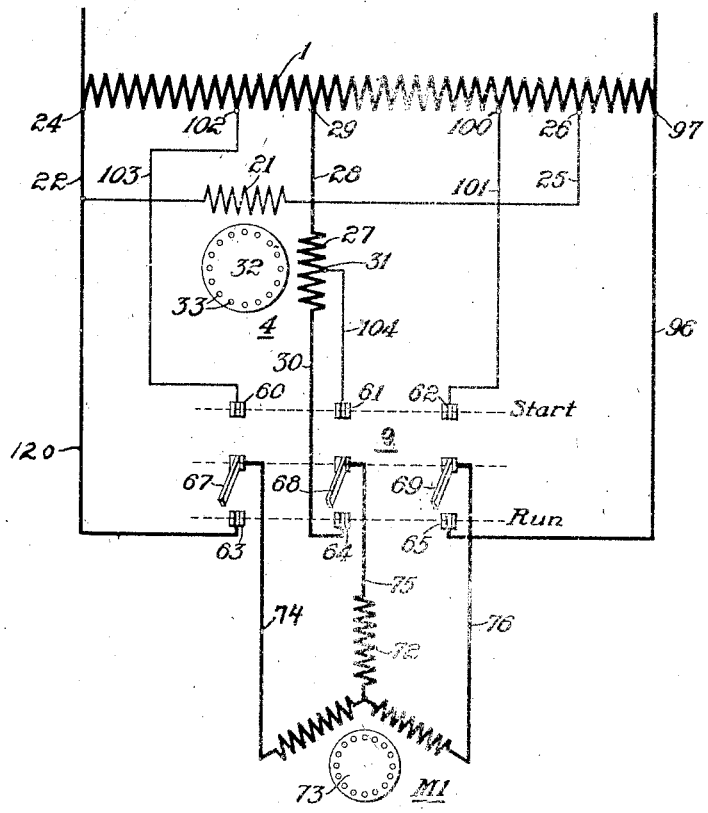

UNITED STATES PATENT OFFICE.

ARTHUR J. HALL, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,349,375.  Specification of Letters Patent.  Patented Aug. 10, 1920.

Application filed July 5, 1917. Serial No. 178,598.

*To all whom it may concern:*

Be it known that I, ARTHUR J. HALL, a citizen of the United States, and a resident of Wilkinsburg, in the county of Allegheny and State of Pennsylvania, have invented a new and useful Improvement in Systems of Control, of which the following is a specification.

My invention relates to systems of control and especially to the operation of polyphase dynamo-electric machines, in conjunction with a single-phase source of energy and a phase-converter machine.

One object of my invention is to provide a system of the above-indicated character, wherein the polyphase machines referred to may be started only when the phase-converter machine is in operation, but are adapted to run irrespective of the condition of the converter machine.

More specifically stated, it is the object of my invention to provide a simple and reliable control system for starting such machines with a relatively low polyphase voltage from a single-phase transformer and a phase-converter jointly and for running the polyphase machines either from the full-voltage connections of the transformer and phase-converter jointly or as single-phase machines from the supply-circuit transformer alone.

My invention may best be understood by reference to the accompanying drawing, wherein the single figure is a diagrammatic view of a system of control organized in accordance with the invention.

Referring to the drawing, the system shown comprises a single-phase source of alternating-current energy such as a shunt transformer 1; a phase-converting machine 4; one or more main dynamo-electric machines or vehicle-propelling motors M1, of the three-phase induction type, for example; and a starting device 9 for governing the operation of the main motor M1.

The phase-converting machine 4 embodies a primary or exciting winding 21, one terminal of which is connected through a conductor 22 to an outer terminal-point 24 of the transformer winding 1 and the other terminal of which is connected through conductor 25 to a movable tap-point 26 that is located near the other end of the transformer winding. A secondary or induced winding 27 for the phase-converter has one terminal connected through conductor 28 to a movable tap-point 29 of the transformer winding, while the other terminal is connected, through conductor 30, to a terminal of the starting device 9.

The rotating element 32 of the phase converter is provided with a squirrel-cage winding 33, for the purpose of providing the familiar induction-motor action during starting periods.

The device 9, which preferably comprises an auto-starter of the familiar oil-immersed type, is here shown in a simplified manner as comprising a plurality of stationary switch members 60, 61 and 62 which are arranged along the line designated "Start", and a plurality of oppositely-located switch members 63, 64 and 65 which are located along the line marked "Run". A corresponding number of movable switch members 67, 68 and 69, which are connected to the terminals of the three-phase motor M1, are preferably provided with a common actuating handle (not shown) and are adapted to be initially connected with the stationary switch members 60, 61 and 62 for the purpose of starting the auxiliary motors and subsequently with the stationary switch members 63, 64 and 65 to operate such motors from the full voltage, in accordance with a familiar practice.

The main dynamo-electric machines or propelling motors M1 are shown as comprising a star-connected stator winding 72 and a squirrel-cage rotor winding 73. A plurality of conductors 74, 75 and 76 are employed to conduct three-phase energy to the the stator winding 72 from the movable switch members 67, 68 and 69, respectively.

It will be understood that any suitable method of starting the phase-converter 4 and bringing it up to full speed may be employed and, consequently, no such exposition is believed to be required.

It is not not deemed necessary to describe in detail the reason for obtaining a substantially balanced three-phase voltage from the outer terminals of the transformer winding 1 and of the phase-converter secondary winding 27, since the illustrated connections and the fact that the number of secondary phase-converter winding turns approximates 86.6 per cent. of the primary turns in the winding 21 are well-known to those skilled in the art. Under the above-mentioned conditions of full running speed of the phase-converter 4, therefore, if the starting device 9 is actuated to its position marked "Start", a relatively low three-phase voltage is impressed upon the driving motor M1 in accordance with the following circuits.

One circuit is established from an intermediate point 100 of the transformer winding 1, through conductor 101 to the stationary switch member 62 of the device 9. Another intermediate point 102 of the secondary transformer winding is connected through conductor 103 to the stationary switch member 60 of the starting device, while the mid-point 31 of the secondary phase-converter winding 27 is connected through conductor 104 to the third stationary switch member 61 that corresponds to the starting position of the device 9.

By subsequently throwing the movable contact members of the device 9, through the agency of the handle member (not shown), into the position marked "Run", the following circuits are established. One full-voltage circuit is established from the terminal 24 of the transformer winding, through conductors 22 and 120, to the stationary switch member 63 of the starting device. A second full-voltage circuit is established from the terminal-point 97 of the transformer winding 1, through conductor 96, to the stationary switch member 65 of the starting device. A third full-voltage circuit is completed from the outer terminal of the secondary phase-converter winding 27, through conductor 30, to the remaining switch member 64 that corresponds to the running position of the starting device. Thus, the full running three-phase balanced voltage is impressed upon the terminals of the main motors, which are accelerated to full speed.

As previously traced, two terminals of each of the driving motors are connected to the respective terminal-points 24 and 97 of the transformer winding 1. Consequently, if for any reason, the phase-converter should fail to operate, thereby eliminating the above-described three-phase voltages, the various motors will nevertheless continue to operate as single-phase motors from the supply-circuit transformer. Such operation is very desirable, particularly in locomotives.

It will be seen, therefore, that my present invention provides a relatively simple and reliable means for starting driving motors from a relatively low polyphase voltage when the phase-converter 4 is operating and for permitting the continued running of such motors after they have been brought up to full speed, irrespective of the condition of the phase-converter. As is well-known, the motors cannot be started into operation through the sole agency of a single-phase supply circuit, but after being started, will continue to operate, even though the three-phase voltage is eliminated and only a single-phase supply remains.

I do not wish to be restricted to the specific circuit arrangement or location of parts herein set forth, as various modifications thereof may be effected without departing from the spirit and scope of my invention. I desire, therefore, that only such limitations shall be imposed as are indicated in the appended claims.

I claim as my invention:

1. In a control system, the combination with a single-phase source of energy, of a phase-converter having a primary winding connected to certain terminal-points of said source and a secondary winding connected to an intermediate point of the source, a polyphase dynamo-electric machine, and means for initially connecting said machine to certain intermediate points of said source and of said secondary winding to start the machine and for subsequently connecting said machine to terminal-points of said source and to the corresponding terminal of said secondary winding to run the machine.

2. In a control system, the combination with a single-phase transformer, of a phase-converter having a primary winding connected across the greater portion of said transformer and a secondary winding connected to an intermediate point of said transformer, a three-phase dynamo-electric machine, and switching means for initially connecting the terminals of said machine to transformer points on either side of said intermediate point and to the mid-point of said secondary winding to start the machine and for subsequently connecting the machine terminals to outer points of said transformer and to the corresponding terminal of said secondary winding to run the machine.

3. In a control system, the combination with a main source of energy, of an auxiliary source of energy having one winding connected to certain points of said source and another winding connected to a different point of the source, a dynamo-electric machine, and means for initially connecting said machine to certain intermediate points of said main source and of said other winding to start the machine and for subsequently connecting said machine to higher-voltage points of said main source and to the corresponding terminal of said other winding to run the machine.

In testimony whereof, I have hereunto subscribed my name this 28th day of June, 1917.

ARTHUR J. HALL.